J. L. WOODBRIDGE.
SYSTEM OF ELECTRICAL DISTRIBUTION.
APPLICATION FILED OCT. 22, 1906.
955,447.
Patented Apr. 19, 1910.
3 SHEETS—SHEET 1.
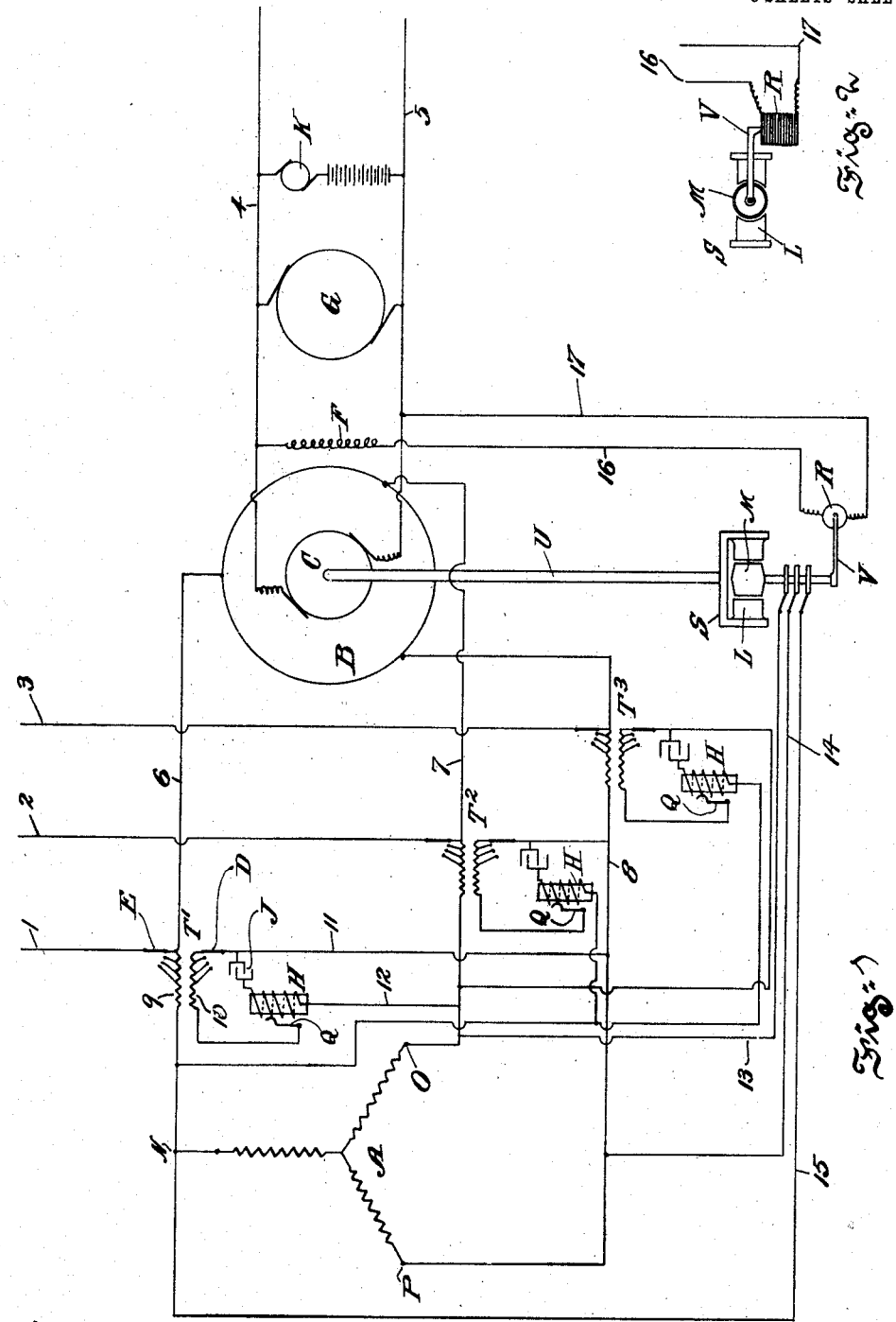

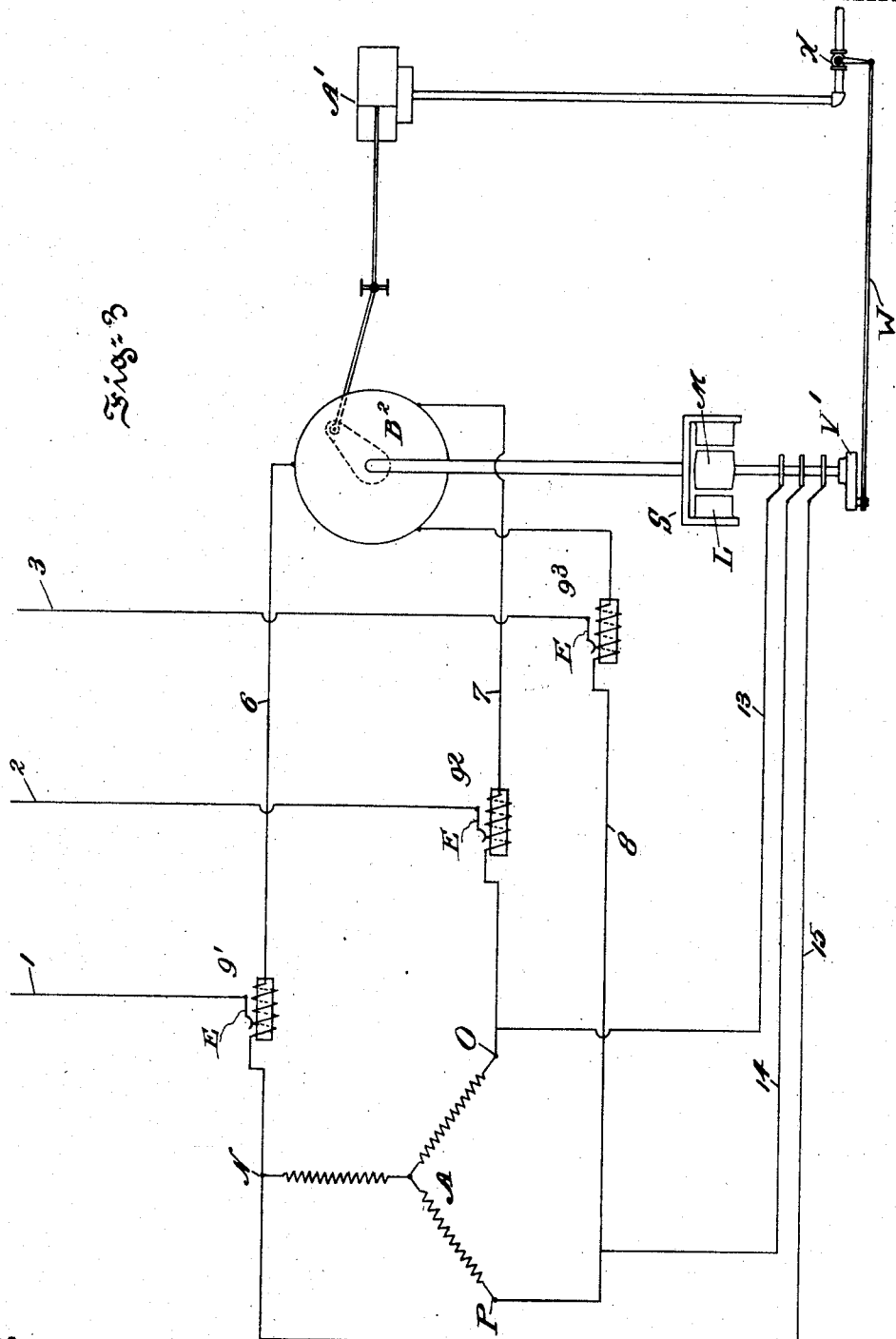

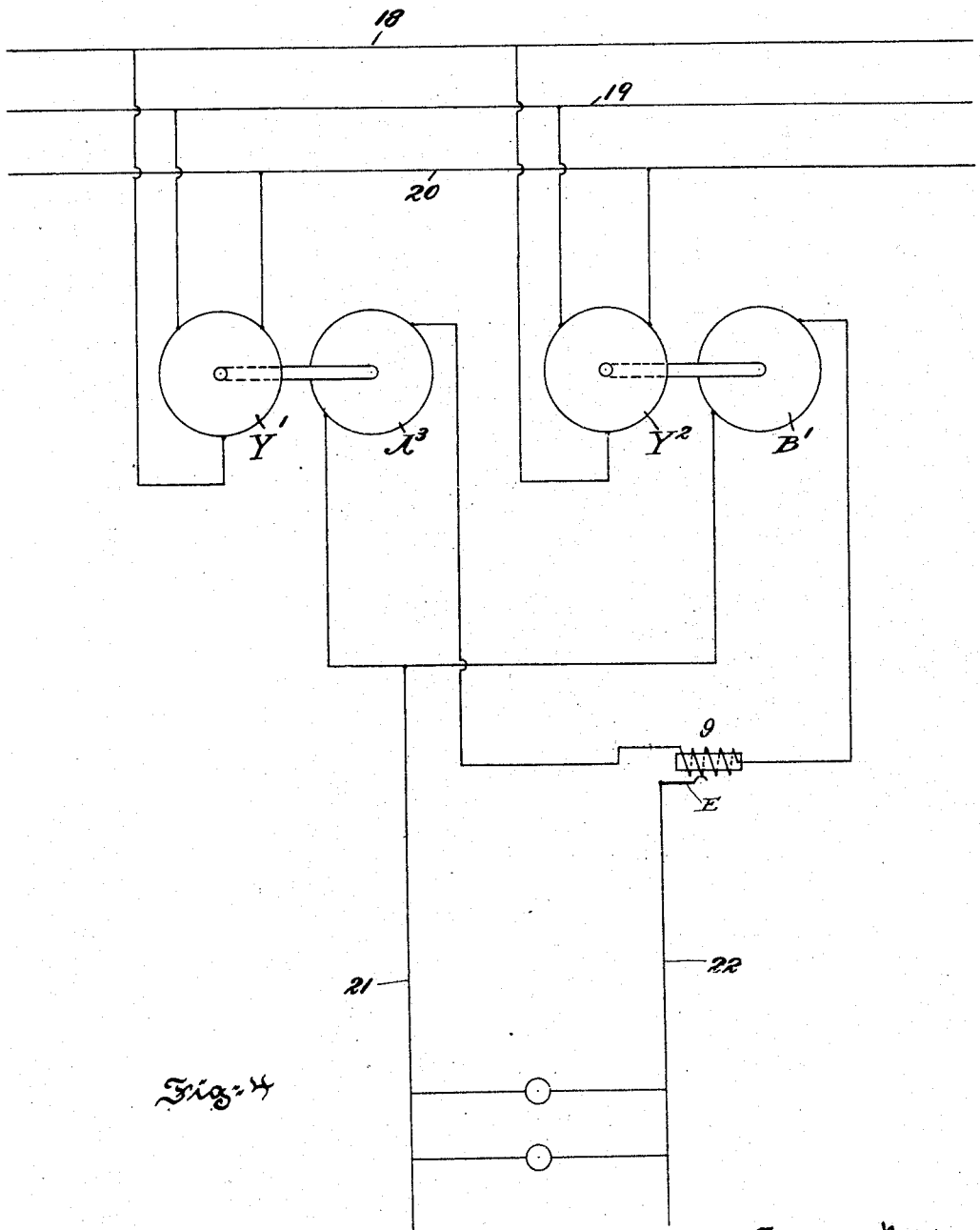

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

955,447.  Specification of Letters Patent.  Patented Apr. 19, 1910.

Application filed October 22, 1906.  Serial No. 340,097.

*To all whom it may concern:*

Be it known that I, JOSEPH LESTER WOODBRIDGE, a citizen of the United States, residing at Philadelphia, in the county of Philadelphia and State of Pennsylvania, have invented certain new and useful Improvements in Systems of Electrical Distribution, of which the following is a specification.

My invention relates to those systems of electrical distribution in which two sources of alternating current are operating in parallel to furnish current to a consumption circuit, and its object is to provide more exact and reliable means for dividing between them in any desired proportion the load required by the consumption circuit, and for maintaining synchronism between them.

The nature, characteristic features and scope of my invention will be more clearly understood by reference to the accompanying drawings forming part hereof, and in which—

Figure 1, illustrates features of my invention. Fig. 2, is another view of a portion of the apparatus shown in Fig. 1, and Figs. 3 and 4, show modifications of the invention.

Referring to Fig. 1, A, is a source of three-phase alternating current, supplying the consumption circuit 1, 2, 3. Connected in parallel to A, by means of the conductors 6, 7, 8, is a rotary converter B, whose commutator C, is connected by suitable brushes to the direct current circuit 4—5, to which current may be furnished by any suitable source, such as the direct current generator G, and the battery and booster K. The combination shown in this figure is arranged to permit the source A, to furnish the entire demand of the consumption circuit 1, 2, 3, when that demand is equal to some predetermined amount, but to compel the direct current circuit 4—5, through the rotary converter B, to take the fluctuations of load above or below this amount; or the adjustment may be such that the rotary converter takes a certain percentage of the load fluctuations, the balance of these fluctuations falling on A. The desired division of load is effected by means of three static transformers $T^1$, $T^2$, and $T^3$, one for each of the three phases.

The connections and mode of operation of transformer $T^1$, will now be described:—$T^2$ and $T^3$ being similar to $T^1$, in every respect. The primary winding 9, of the transformer $T^1$, is connected into the conductor 6, between the terminal N, of the source A, and the corresponding terminal of the rotary converter B. The secondary winding 10, of this transformer is connected by means of conductors 11, and 12, to the other two terminals P, and O, of the source A, there being introduced into conductor 12, a reactance coil H. A condenser J, is also shown, connected across conductors 11 and 12, in parallel with the secondary winding 10, and so connected that the reactance coil H, is located between the condenser and the terminal O, of the source A. A switch Q, serves to cut out sections of the reactance coil H, from the circuit between the terminal O, and the secondary winding 10, these sections being then included in the condenser circuit which is in parallel with 10.

It can be shown that, in the combination of circuits including the reactance H, the condenser J, the winding 10, and conductors 11 and 12, if the reactance of H, is equal to the condensance of J, and the resistances of H, J, 11 and 12, are negligible, the current in 10, will be proportional to the voltage between P, and O, and will be constant if that voltage is constant, regardless of the resistance or reactance of 10, or of any electro-motive-force, which may be introduced into its circuit. This current is equal to $\frac{V}{x}$, in which expression V, is the voltage across P and O, and x, is the reactance of H, equal and of opposite sign to the condensance of J. This current will be of a phase 90° behind that of the voltage across P, O, and therefore in phase with the current output from N, to the consumption circuit, at unity power factor. It will be noted that by moving the switch Q, so as to cut out some of the coils of H, the reactance included between O, and 10, (and therefore the value of x, in the above formula), can be reduced. The coils thus cut out are thereby included in the condenser circuit, but as their reactance is of opposite sign to the condensance of J, they will reduce the condensance of that circuit by the same amount that the reactance between O, and 10, has been reduced and the equality between reactance and condensance will be maintained. Thus for any position of the switch Q, the current in 10, will be constant, but it may be varied at will by changing the position of Q. A switch D, is also shown, whereby the number of turns of the winding 10, in circuit may be varied. Thus by suitably adjusting the switches Q and D, the number of ampere turns in the winding 10, may be varied over any desired range. They may therefore be made equal and opposite to the ampere-turns in the primary winding 9, when the latter is carrying any desired current output from the source A. Under such conditions of equality the secondary winding 10, will exactly counteract the primary winding 9, and there will be no magnetic flux in the iron core of the transformer $T^1$, and no electro-motive-force will be induced in either winding. If, however, there is any tendency for additional current to flow from the terminals N, through the winding 9, due for example to an increase of load on the consumption circuit, the latter winding will act as a choke coil toward such excess current, and a very small portion of such increase of load, getting back to the source A, through the winding 9, will develop in the latter a counter-electro-motive-force such as to oppose further increase and compel the rotary converter B, to take the balance of the increase.

A switch E, is shown, whereby the conductor 1, of the consumption circuit 1, 2, 3, may be connected to various points in the winding 9. When the switch E, is in the position shown in the drawing, the entire winding 9, is located between conductor 1 and terminal N, of the source A, and the effect is to throw practically all of the fluctuations of load on the rotary B. If, however, the switch E, is adjusted so as to make contact at some intermediate point in the winding 9, leaving a portion of its turns between conductor 1, and the rotary B, any output from the rotary to the consumption circuit must pass through these turns and its effect will be opposite to that of current from N. To produce equilibrium, therefore, the fluctuations of load must divide between A, and B, in the inverse ratio of the number of turns of the winding 9, in the circuit of each, and any tendency to produce any other division of load than this will produce in the winding 9, a counter-electro-motive-force such as to counteract such tendency. It will be understood that the transformers $T^2$ and $T^3$ in the other two phases are identical with $T^1$, and are connected up with condensers and reactances and adjusting switches in precisely the same way, so that the above description need not be repeated.

The apparatus above described will therefore serve to permit the average demand or any predetermined portion of that average to fall on A, and also any predetermined proportion of the fluctuations above and below that average, while the balance of the load on the consumption circuit, whether of the average or of the fluctuations, must fall on the rotary converter B, and through it on the direct current circuit 4—5.

As stated above, the primary windings of the transformers $T^1$, $T^2$, and $T^3$, act as choke coils between the source A, and the rotary converter B, opposing any departure from the predetermined division of load for which adjustment has been made. If, therefore, there should develop any tendency in the rotary converter to fall out of synchronism, these choke coils will prevent the source A, from supplying the necessary current to hold the rotary converter in step, and some other means must be provided to accomplish this. For this purpose a small synchronous motor S, is provided, having its fields L, mounted directly on the shaft U, of the rotary, and its armature M, connected by the usual collector rings and brushes and the conductors 13, 14, 15, to the respective terminals N, O, and P, of the source A. If the fields L, were stationary the armature M, would tend to revolve in synchronism with the source A, and the connections are such that this rotation would be in the opposite direction to that of the rotary converter. Since, however, the fields L, are mounted on the rotary converter shaft U, and rotate with it, if this rotation is exactly in synchronism with A, the armature M, will remain stationary (assuming, of course, that the motor S, has the same number of poles as the rotary). Mounted on the shaft of the armature M, is an arm V, which bears upon a pile of carbon disks R. A side elevation of this portion of the apparatus is shown in Fig. 2. The carbon pile R, is connected in series with the field F, of the rotary converter by means of the conductors 16, and 17, the field F, being energized in the usual manner from the direct current circuit 4—5. Any variation in the pressure exerted by the arm V, on the carbon disks R, will vary the resistance of R, and therefore vary the strength of the field F. The adjustment is such that when the rotary converter is exactly in step with A, the armature M, and arm V, will be in such position that the pressure on the carbon pile R, will be suitable to produce the necessary flow of current in the field F. If there is any tendency for the rotary converter armature to increase its speed, there will result a tendency to rotate the armature M, in such direction as to increase the pressure on the carbon pile R. This will reduce its resistance, and permit more current to flow through F. The increase field strength thus produced will increase the counter-electro-motive-force, of the rotary converter, thus reducing the amount of current which it will receive from the circuit 4—5. This reduction of energy will check the tendency to increased speed of the rotary converter armature. Should there be a tendency to decrease the speed, the results would be reversed, the pressure of V, on R, would be relieved, the field of the rotary converter would be weakened and more energy would be delivered to the rotary converter armature from the circuit 4—5, thus maintaining the speed. Thus the motor S, by varying the pressure on the carbon pile R, will, by controlling the supply of energy to the rotary converter in response to slight variations in its phase relation to the source A, hold it in synchronism with that source.

In Fig. 3, the rotary converter B, and its direct current supply circuit is replaced by an alternator $B^2$, operating in parallel with the source A, and driven by a steam engine $A^1$. The transformers $T^1$, $T^2$, and $T^3$, are replaced by the reactances $9^1$, $9^2$, and $9^3$, the secondary winding, condensers and reactances H, being omitted. In this case the adjustment is such that when there is no load on the consumption circuit 1, 2, 3, there will be no load on either A, or $B^2$. When, however, there occurs a demand for current on the consumption circuit, the load will divide between A, and $B^2$, in inverse ratio of the number of turns of the reactance coil $9^1$, included on either side of the conductor 1, by the position of the switch E. This division of load will produce equal and opposite ampere turns in each section of the coil $9^1$, which will therefore neutralize each other and no magnetic flux will be produced in the magnetic circuit of the reactance and therefore in its windings such as to counteract With any tendency to depart from this division of load, the reactance $9^1$, will act as a choke coil, developing an electro-motive-force in its windings such as to counteract such tendency. As in Fig. 1, a synchronous motor S, has its fields L, mounted on the shaft of $B^2$, and its armature connected by conductors 13, 14, 15, to the source A, in such manner that when $B^2$, is maintained in synchronism with A, the armature M, will be stationary. A crank $V^1$, is attached to the shaft of the armature M, which by means of the rod W, and the valve X, controls the supply of steam, to the engine $A^1$. If the machine $B^2$, tends to increase its speed, the armature M, will move and produce such change in the position of V, as will partially close the valve X, reducing the supply of steam and therefore the amount of energy delivered to $B^2$. This will counteract the tendency to increase of speed, and hold the machine $B^2$, in synchronism with A. It will be understood of course, that any of the well known devices for controlling the supply of steam to the engine may be substituted for the valve X; also, other devices for actuating the steam control in response to changes in phase relation between the machine $B^2$, and the source A, may be substituted for the motor S, without in any way affecting the spirit of the invention.

In Fig. 4, are shown two motor generator sets $Y^1$ $A^3$, and $Y^2$ $B^1$, such as are employed for transforming alternating currents from one frequency to another or from one number of phases to another. As here shown the two synchronous motors $Y^1$, and $Y^2$, are connected in parallel to a 3-phase supply circuit 18, 19, 20, and mounted one on the shaft of each motor, are two single phase alternators $A^3$, and $B^1$, which are connected in parallel to the consumption circuit 21—22. As ordinarily operated, it is impossible to effect any considerable variation in the division of load between two such motor generator sets, when connected in parallel on both sides; and in fact, unless the generator armatures are keyed to the shafts very accurately in the same relative phase-relation to the motor armatures, an abnormal and undesirable division of load may result. By the introduction of the reactance coil 9 and the switch E, whose operation is exactly the same in this case as described in connection with Figs. 1 and 3, the division of load between the two machines may be adjusted at will. In as much as the machines $A^3$, and $B^1$, are in this case held in synchronism by the fact that the motors $Y^1$, and $Y^2$, are connected to the same supply circuit, other means for maintaining synchronism such as the motor S, of previous figures, will not be required.

It will be understood that the transfer of energy through the apparatus shown in Fig. 4, may be reversed in direction without altering its general mode of operation. That is, the circuit 21, 22, may become the supply circuit and the circuit 18, 19, 20, the consumption circuit, in which case the reactance coil 9, and switch E, will still control the division of load between the two motor generator sets.

What I claim is:

1. In combination two sources of alternating current connected to a consumption circuit in parallel relation, a winding embracing a magnetic circuit and included in the circuit between the two sources; means adapted to reduce the magnetic flux in the magnetic circuit to zero when the load on the consumption circuit is divided between the two sources in some predetermined proportion, and means responsive to changes in the phase relation between the two sources for controlling the energy supplied to one of them.

2. Two alternating current dynamo-electric machines connected in parallel relation, a winding embracing a magnetic circuit connected between them, a consumption circuit, means for connecting the consumption circuit to an intermediate point in said winding and a supply of energy for one of said machines controlled by changes in its phase relation to the other.

3. In combination a source of alternating current and its consumption circuit; a source of direct current; transforming apparatus connected to both sources and adapted to transfer energy in either direction between them; a winding embracing a magnetic circuit and connected between the source of alternating current and the alternating current terminal of the transforming apparatus; a second winding embracing the same magnetic circuit; and means adapted to send through the second winding a predetermined current substantially independent of any counter-electro-motive-force which may be developed in said winding.

4. In combination a source of alternating current and its consumption circuit; a source of direct current; transforming apparatus connected to both sources and adapted to transfer energy in either direction between them; a winding embracing a magnetic circuit and connected between the source of alternating current and the alternating current terminal of the transforming apparatus; a second winding embracing the same magnetic circuit, a reactance coil connected in series with the second winding, a condenser connected in parallel with the second winding, and means for applying to the terminals of the circuit comprising the reactance coil and the second winding an alternating current electro-motive-force.

5. In combination a source of alternating current and its consumption circuit; a source of direct current; transforming apparatus connected to both sources and adapted to transfer energy in either direction between them, a winding embracing a magnetic circuit and connected between the source of alternating current and the alternating current terminal of the transforming apparatus; a second winding embracing the same magnetic circuit; means adapted to send through the second winding a predetermined current independent of any counter-electro-motive-force which may be developed in said winding; and means responsive to changes of phase relation between the source of alternating current and the transforming apparatus and adapted to control the interchange of energy between said apparatus and the direct current source.

6. In combination a source of alternating current and its consumption circuit; a source of direct current; transforming apparatus connected to both sources and adapted to transfer energy in either direction between them; a winding embracing a magnetic circuit and connected between the source of alternating current and the alternating current terminal of the transforming apparatus; a second winding embracing the same magnetic circuit; a supplemental circuit comprising in series relation a source of alternating electro-motive-force, a reactance coil, and a condenser; a connection from one terminal of the second winding on the magnetic circuit to a point in the supplemental circuit between the condenser and the source of alternating current electro-motive-force; and means for connecting at will the other terminal of said winding to any one of several intermediate points in the reactance coil.

7. In combination a source of alternating current electro-motive-force a reactance coil and a condenser connected in series relation, a conducting circuit, and means for connecting one terminal of the circuit to that terminal of the condenser which is connected to the source and the other terminal of the circuit to any desired point in the reactance coil.

8. In combination an alternating current circuit, an alternating current dynamo-electric machine, a source of energy for the latter, and means responsive to changes in phase relation between the dynamo-electric machine and the circuit and independent of the transfer of energy between them and adapted to control the transfer of energy between said machine and its source of energy.

9. An alternating current dynamo electric machine having a stationary and a movable member, a source of energy for said machine, an alternating current circuit, and means for controlling the phase relation between the machine and the circuit comprising a synchronous motor whose elements (armature and field) are both free to revolve, a mechanical connection between one of said elements and the moving member of the dynamo electric machine, and means responsive to motion of the other of said elements of the synchronous motor and adapted to control the supply of energy to the dynamo electric machine and electrical connection between the source of alternating current electro-motive-force and the armature of the synchronous motor.

10. A source of alternating current electro-motive-force, an alternating current dynamo electric machine connected in parallel relation to the source, means independent of the source for supplying energy to the dynamo-machine, a reactance coil connected between the source and the dynamo-machine and adapted to prevent the flow of synchronizing current between them, and means responsive to changes in phase relation between them and adapted to control the supply of energy to the dynamo machine.

In testimony whereof I have hereunto signed my name.

JOSEPH LESTER WOODBRIDGE.

Witnesses:
W. J. JACKSON,
K. M. GILLIGAN.